US012445486B2

(12) United States Patent
Singh

(10) Patent No.: US 12,445,486 B2
(45) Date of Patent: *Oct. 14, 2025

(54) PREVENTING PHISHING ATTEMPTS OF ONE-TIME PASSWORDS

(71) Applicant: Citrix Systems, Inc., Ft. Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 365 days.

This patent is subject to a terminal disclaimer.

(21) Appl. No.: 17/714,261

(22) Filed: Apr. 6, 2022

(65) Prior Publication Data

US 2023/0121470 A1 Apr. 20, 2023

Related U.S. Application Data

(63) Continuation of application No. 17/501,582, filed on Oct. 14, 2021, now Pat. No. 11,356,481.

(51) Int. Cl.
*H04L 9/40* (2022.01)

(52) U.S. Cl.
CPC ...... *H04L 63/1483* (2013.01); *H04L 63/0838* (2013.01); *H04L 63/126* (2013.01); *H04L 63/1466* (2013.01)

(58) Field of Classification Search
CPC ... H04L 9/40; H04L 63/1483; H04L 63/0838; H04L 63/126; H04L 63/1466
See application file for complete search history.

(56) References Cited

U.S. PATENT DOCUMENTS

| 8,776,196 | B1* | 7/2014 | Oliver | H04L 63/1483 726/5 |
| 8,838,973 | B1* | 9/2014 | Yung | H04L 63/1483 713/172 |
| 9,002,750 | B1* | 4/2015 | Chu | H04W 12/04 705/72 |
| 9,674,213 | B2* | 6/2017 | Oberheide | H04L 63/105 |

(Continued)

OTHER PUBLICATIONS

Moholkar et al., An Efficient Approach for Phishing Website Detection using Visual Cryptography (VC) and Quick Response Code (QR Code), International Journal of Computer Applications (0975-8887) vol. 115—No. 12, Apr. 2015 (Year: 2015) 4 pages.

(Continued)

*Primary Examiner* — Jayesh M Jhaveri

(57) ABSTRACT

A computer system is provided. The computer system includes a memory and at least one processor coupled to the memory and configured to identify a first domain name associated with a website that served a login form to a web browser. The at least one processor is further configured to identify a one-time password (OTP) entry request served from the website in response to transmitting user credentials to the website. The at least one processor is further configured to identify a second domain name associated with an OTP server that provided an OTP. The at least one processor is further configured to perform a security action in response to determining that the first domain name differs from the second domain name. The security action may include blocking a response to the OTP request from the website, providing a warning, and/or obtaining confirmation for the response to the OTP entry request.

18 Claims, 7 Drawing Sheets

(56) References Cited

U.S. PATENT DOCUMENTS

2007/0067828 A1    3/2007  Bychkov
2018/0343562 A1*  11/2018  Nalukurthy ......... H04L 63/0838
2021/0144174 A1*  5/2021  N ........................ H04L 63/1483
2021/0377300 A1*  12/2021  Devane ............... H04L 63/1416

OTHER PUBLICATIONS

Khan, Preventing Phishing Attacks using One Time Password and User Machine Identification, International Journal of Computer Applications (0975-8887) vol. 68—No. 3, Apr. 2013 (Year: 2013) 5 pages.

* cited by examiner

PREVENTING PHISHING ATTEMPTS OF ONE-TIME PASSWORDS

CROSS-REFERENCE TO RELATED APPLICATIONS

This application claims the benefit under 35 U.S.C. § 120 as a continuation of U.S. patent application Ser. No. 17/501,582, titled "PREVENTING PHISHING ATTEMPTS OF ONE-TIME PASSWORDS," filed on Oct. 14, 2021. The aforementioned application is hereby incorporated herein by reference in its entirety.

BACKGROUND

Password security is an issue of great importance, as attacks on computer systems and the users of those systems continue to increase due to compromised passwords. There are many ways in which passwords, including one-time passwords (OTPs), can be leaked, or compromised through inadvertent user actions. Simply relying on user vigilance, which is subject to lapse, does not provide reliable or sufficient security.

SUMMARY

In at least one example, a computer system is provided. The computer system includes a memory; and at least one processor coupled to the memory and configured to: identify a first domain name associated with a website that served a login form to a web browser; identify a one-time password (OTP) entry request served from the website in response to transmitting user credentials to the website; identify a second domain name associated with an OTP server that provided an OTP; determine that the first domain name differs from the second domain name; and perform a security action in response to the determination.

At least some examples of the computer system can include one or more of the following features. The security action comprises blocking a response to the OTP request from the website. The security action comprises providing a warning and obtaining confirmation for the response to the OTP entry request from the website. The at least one processor is further configured to receive the OTP from the OTP server through a Short Message Service (SMS) text message. The computer system is a first client device and the at least one processor is further configured to receive the OTP from a second client device, wherein the OTP is sent to the second client device as an SMS text message from the OTP server. The at least one processor is further configured to receive the OTP through an email from the OTP server. The at least one processor is further configured to provide credentials entered into the login form to the to the website to trigger the OTP entry request. The at least one processor is further configured to analyze Hypertext Markup Language (HTML) input field labels to detect that the website served the login form and the OTP entry request to the web browser. The at least one processor is further configured to perform computer vision analysis to detect that the website served the login form and the OTP entry request to the web browser.

In at least one example, a computer system is provided. The computer system includes a memory; and at least one processor coupled to the memory and configured to: identify a domain name associated with a one-time password (OTP) server based on a phone number associated with a Short Message Service (SMS) text message that includes an OTP generated by the OTP server.

At least some examples of the computer system can include one or more of the following features. The at least one processor is further configured to provide the identified domain name to an OTP phishing protection system hosted on a client device. The at least one processor is further configured to receive the phone number from a mobile phone associated with the client device. The at least one processor is further configured to reference a database to identify the domain name associated with the OTP server, the database configured to cross-reference phone numbers to OTP server domain names. The database is updated using crowd sourcing techniques.

In at least one example, a non-transitory computer readable medium storing executable sequences of instructions to provide protection against phishing of one-time passwords (OTPs), the sequences of instructions comprising instructions to: identify a first domain name associated with a website that served a login form to a web browser; identify an OTP entry request served from the website in response to transmitting user credentials to the website; identify a second domain name associated with an OTP server that provided an OTP; determine that the first domain name differs from the second domain name; and perform a security action in response to the determination.

At least some examples of the non-transitory computer readable medium can include one or more of the following features. The security action comprises blocking a response to the OTP request from the website. The security action comprises providing a warning and obtaining confirmation for the response to the OTP entry request from the website. Instructions to receive the OTP from the OTP server through a Short Message Service (SMS) text message. The computer system is a first client device and the sequences of instructions further include instructions to receive the OTP from a second client device, wherein the OTP is sent to the second client device as an SMS text message from the OTP server. Instructions to receive the OTP through an email from the OTP server. Instructions to provide credentials entered into the login form to the to the website to trigger the OTP entry request. Instructions to analyze Hypertext Markup Language (HTML) input field labels to detect that the website served the login form and the OTP entry request to the web browser. Instructions to perform computer vision analysis to detect that the website served the login form and the OTP entry request to the web browser.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

As noted previously, password security is an issue of great importance, as attacks on computer systems and the users of those systems continue to increase due to compromised passwords. Multifactor authentication is sometimes employed as a technique for improving security. One variation of multifactor authentication includes the use of one-time passwords which are sent to a user's device (often a second device such as a mobile phone) after the user enters their username and password. Unfortunately, however, bad actors have devised methods to subvert this process by phishing for the OTP, as will be described below. Existing systems rely on user vigilance to recognize phishing attempts. Such vigilance is subject to lapse and does not provide reliable or sufficient security.

Figure 1:
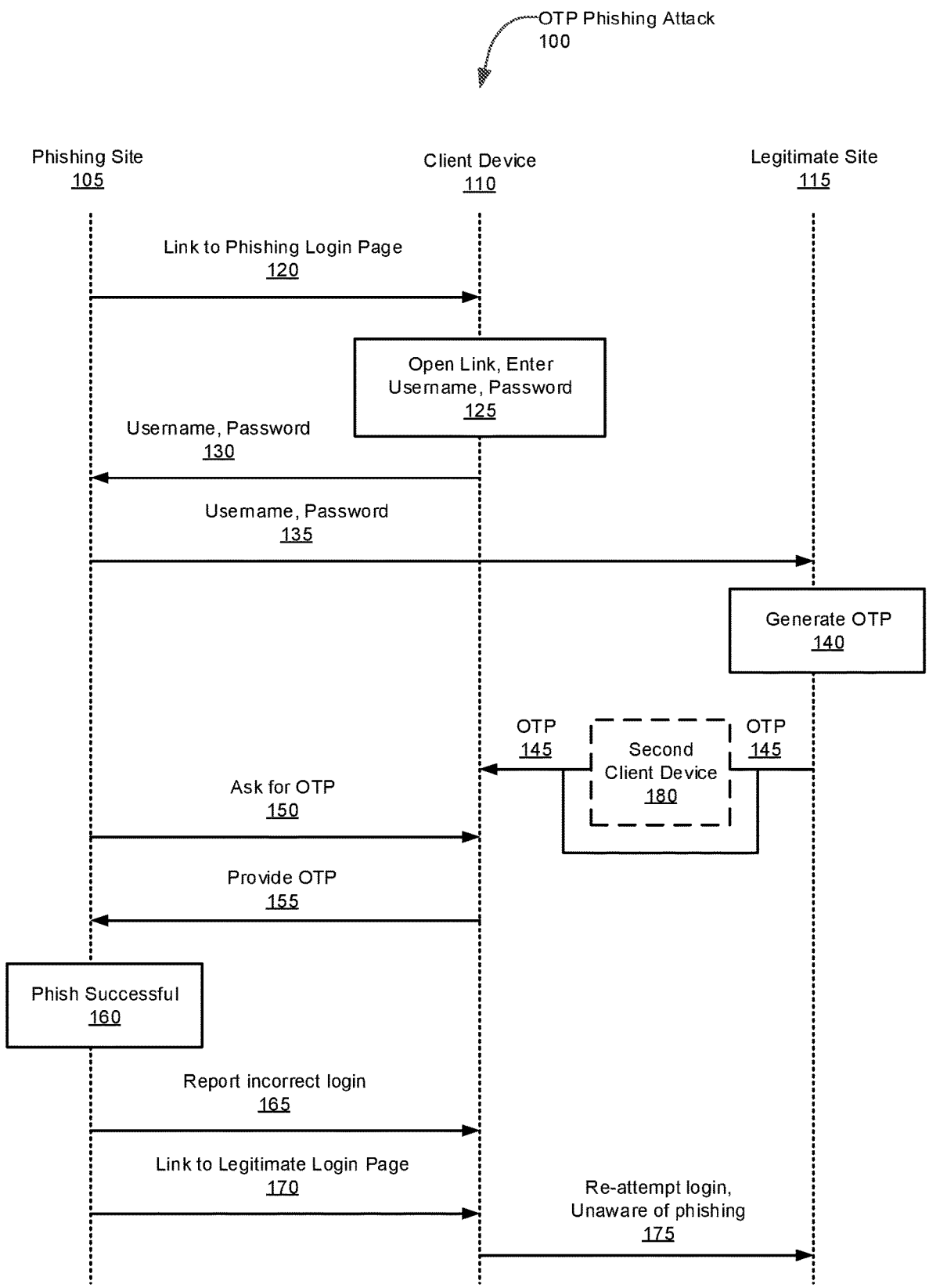
FIG. 1 is a sequence diagram of an OTP phishing attack, in accordance with an example of the present disclosure.

FIG. 1 is a sequence diagram of an OTP phishing attack 100, in accordance with an example of the present disclosure. In this example, a phishing website 105 sends a link 120 to the user of a client device 110. The client device may be any type of computing platform such as a workstation, laptop, tablet, smartphone, etc. The link may be sent to the targeted user in an email, for example, and include a domain name of the phishing website which resembles a domain name of a legitimate website 115. Sometimes, for example, a letter "o" is changed to a zero or a letter "l" is changed to a one so that the phishing domain name is easily mistaken for the legitimate website, particularly when the user is distracted or in a hurry. The user may therefore click on the link, at operation 125, which opens a login form on the phishing website, into which the user enters their credentials (e.g., username and password) 130.

The phishing site 105 then sends those credentials, at operation 135, to the legitimate website 115. Since the credentials are valid, the legitimate site generates an OTP, at operation 140. The legitimate site then sends that OTP, at operation 145, to either the client device 110 or a second client device 180, whichever device has been registered by the user for multifactor authentication. For example, the user may be working on a laptop 110 and receiving the OTP as a Short Message Service (SMS) text message on their smartphone 180. Alternatively, the user may receive the OTP in an email at their laptop (e.g., the first client device 110) or at another client device. Other variations are possible.

The phishing site, at operation 150, asks the user to enter the OTP that was just received and, at operation 155, the user does so, still believing that they are communicating with the legitimate site 115. At this point, 160, the phishing attempt has been successful since the phishing site 105 now has the user's credentials and the OTP and can use these to login to the legitimate site.

To complete the deception, in some examples, the phishing site may report, at operation 165, that the login attempt was unsuccessful. Then, at operation 170, the phishing site may send the user a new link to the legitimate site. The user will likely believe that they made a mistake typing in either their credentials or the OTP and, at operation 175, re-attempt the login, this time at the legitimate site. The re-attempt should succeed, and the user will be unaware of the phishing attack.

To address these and other problems, and as summarized above, various examples described herein are directed to systems and methods to provide protection against OTP phishing attempts. In some examples, the disclosed techniques are implemented, at least in part, by a web browser plug-in or extension on the client device of the user. In some examples, the disclosed techniques are also implemented, at least in part, by an OTP monitor on a smartphone device of the user and/or a backend workspace server, as will be described in greater detail below.

In some examples, the disclosed techniques provide protection against OTP phishing by detecting a difference between the domain name of the website asking for credentials (which may be a phishing site) and the domain name of the server that generates the OTP (which is a legitimate site). If a difference is detected, the user is warned of the potential phishing attack and/or prevented from entering the OTP, as will be described below.

These systems and methods overcome a security problem in which even the most security-conscious user can inadvertently enter their credentials into a phishing website, receive an OTP from a legitimate website, and then enter that OTP back into the phishing website. For example, a user may be distracted by other workplace demands and inadvertently click on a link to a website with a domain name that looks legitimate, enter their username and password, receive a legitimate OTP on their smartphone or another device, and enter that OTP into the phishing site. The disclosed techniques detect that the website requesting the OTP is not associated with the website that generated the OTP and perform an appropriate security action in response.

As will be understood in view of this disclosure, the systems and methods for mitigating or preventing OTP phishing attacks provided herein have advantages over existing methods which depend on user detection of suspicious links. For instance, the systems and methods described herein provide automated detection and warning of malicious requests to enter an OTP and do not rely on user vigilance, which is subject to lapse.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

OTP Phishing Protection System

Figure 2:
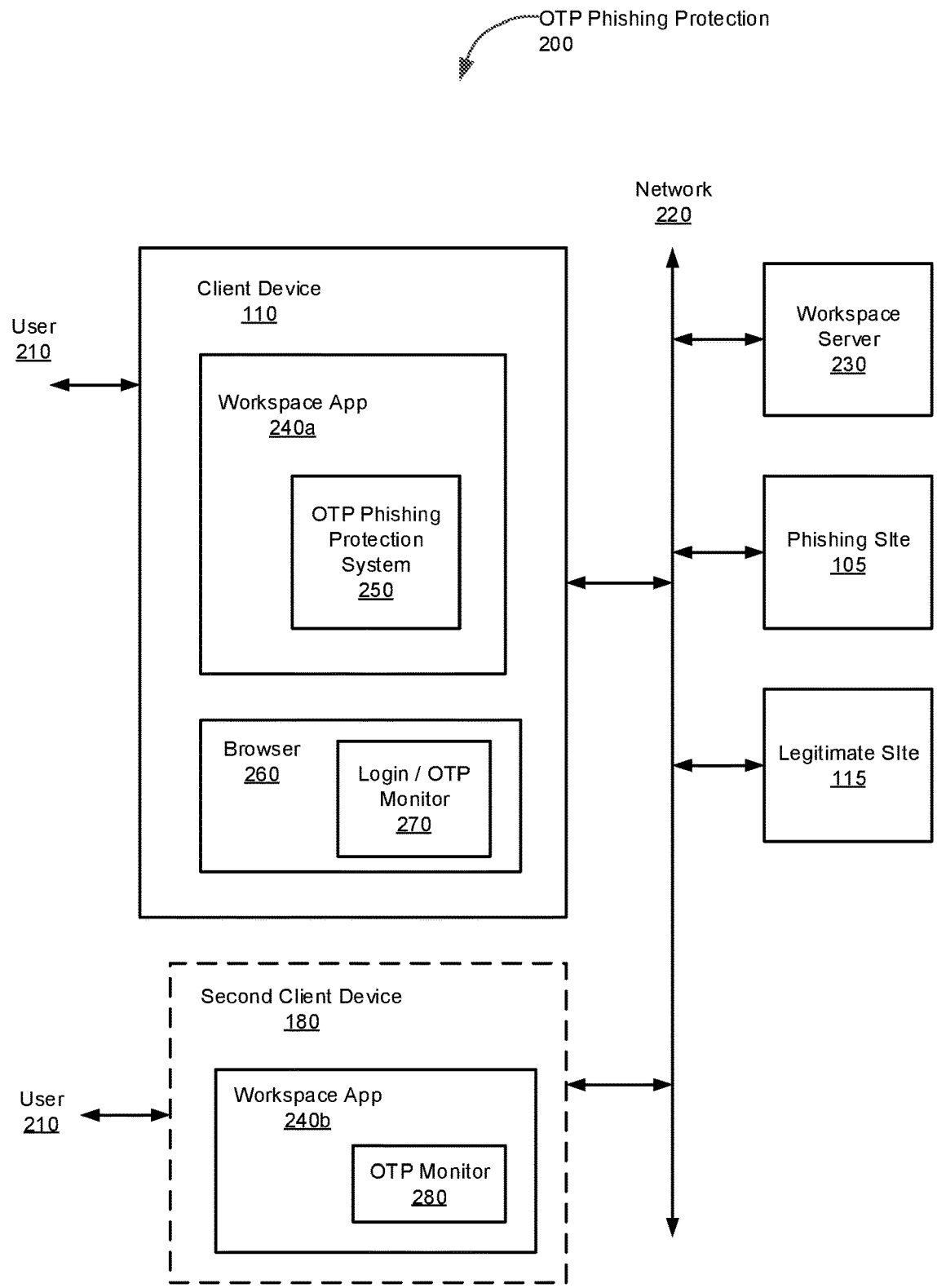
FIG. 2 is a top-level block diagram of an implementation of a system for providing protection against OTP phishing attacks, in accordance with an example of the present disclosure.

FIG. 2 is a top-level block diagram of an implementation 200 of a system for providing protection against OTP phishing attacks, in accordance with an example of the present disclosure. As shown in FIG. 2, the implementation is shown to include the client device 110 (also referred to as a first client device) and the optional second client device 180, of FIG. 1, and a workspace server 230. Also shown are the phishing site 105 and the legitimate site 115, of FIG. 1.

The client device 110 (e.g., a device such as a laptop, tablet, mobile device, workstation, etc.) is configured to execute a web browser application 260 which includes a login/OTP monitor extension or add-in 270. The client device 110 is also configured to execute a workspace application (or app) 240a which includes an OTP phishing protection system 250. In some examples, the workspace app 240a may perform other functions unrelated to the OTP phishing protection techniques disclosed herein. The client device 110 may communicate over a network 220, for example the Internet and/or cellular phone networks, with workspace server 230, phishing site 105, legitimate site 115, and second client device 180.

The second client device 180 is configured to execute another workspace app 240b which includes an OTP monitor 280. In some examples, the workspace app 240b may perform other functions unrelated to the OTP phishing protection techniques disclosed herein. In some examples, the second client device 180 is a smartphone or other mobile communication device that may be registered with the legitimate site 115 for use in multi-factor authentication. For example, the second client device 180 can receive a text message with an OTP when the first client device 110 attempts to login to the legitimate site 115.

The operation of the OTP phishing protection system 250, the login/OTP monitor 270, the OTP monitor 280, and the workspace server 230 will be explained in greater detail below, in the OTP phishing protection process description. At a high-level, however, these systems are configured to detect whether the domain name of the website asking for credentials (which may be the phishing site 105) and the domain name of the server that generates the OTP (which is the legitimate site 115) are the same. If a difference is detected, the user is warned of the potential phishing attack and/or prevented from entering the OTP. If the domain names match, however, then the credential requesting site is deemed to be legitimate and OTP entry is permitted.

In some examples, the login/OTP monitor 270 is configured to determine the domain name of the website asking for credentials. In some examples, the workspace server 230 is configured to determine the domain name of the server that generates the OTP, for example based on the SMS text message phone number provided by the second client device 180. In some examples, the OTP phishing protection system 250 is configured to detect a difference between the domain name of the website asking for credentials and the domain name of the server that generates the OTP.

Figure 3:
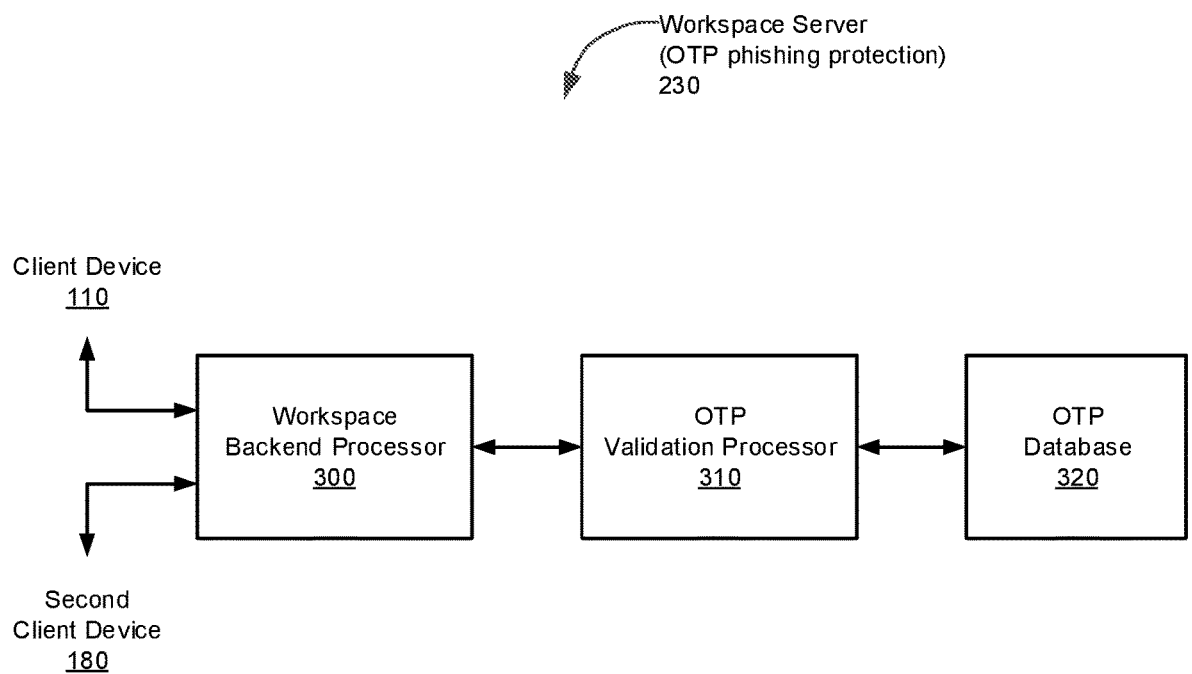
FIG. 3 is a block diagram of the workspace server, in accordance with an example of the present disclosure.

FIG. 3 is a block diagram of the workspace server 230 of FIG. 2, in accordance with an example of the present disclosure. The workspace server 230 is shown to include a workspace backend processor 300, an OTP validation processor 310, and an OTP database 320.

The workspace backend processor 300 is configured to receive a phone number from the second client device, for example a mobile device or smartphone associated with the client device and registered for multi-factor authentication. In some examples, the phone number is associated with an SMS text message sent to the mobile device, the text message including the OTP generated by the OTP server.

The OTP validation processor 310 is configured to identify a domain name associated with the OTP server based on the phone number. In some examples, the identification is accomplished by reference to the OTP database 320 that is configured to cross-reference phone numbers to OTP server domain names. In some examples, the database is created and updated using crowd sourcing techniques. In some examples, the database is accessed from public sources.

The workspace backend processor 300 is further configured to provide the identified domain name to the OTP phishing protection system 250, of FIG. 2, hosted on the client device.

OTP Phishing Protection Process

As described above, some examples of the implementation 100 of FIG. 1 are configured to perform a process for protection against OTP phishing attacks. The processes may be executed on a processor of any suitable type (e.g., processor 510 of FIG. 5).

Figure 4:
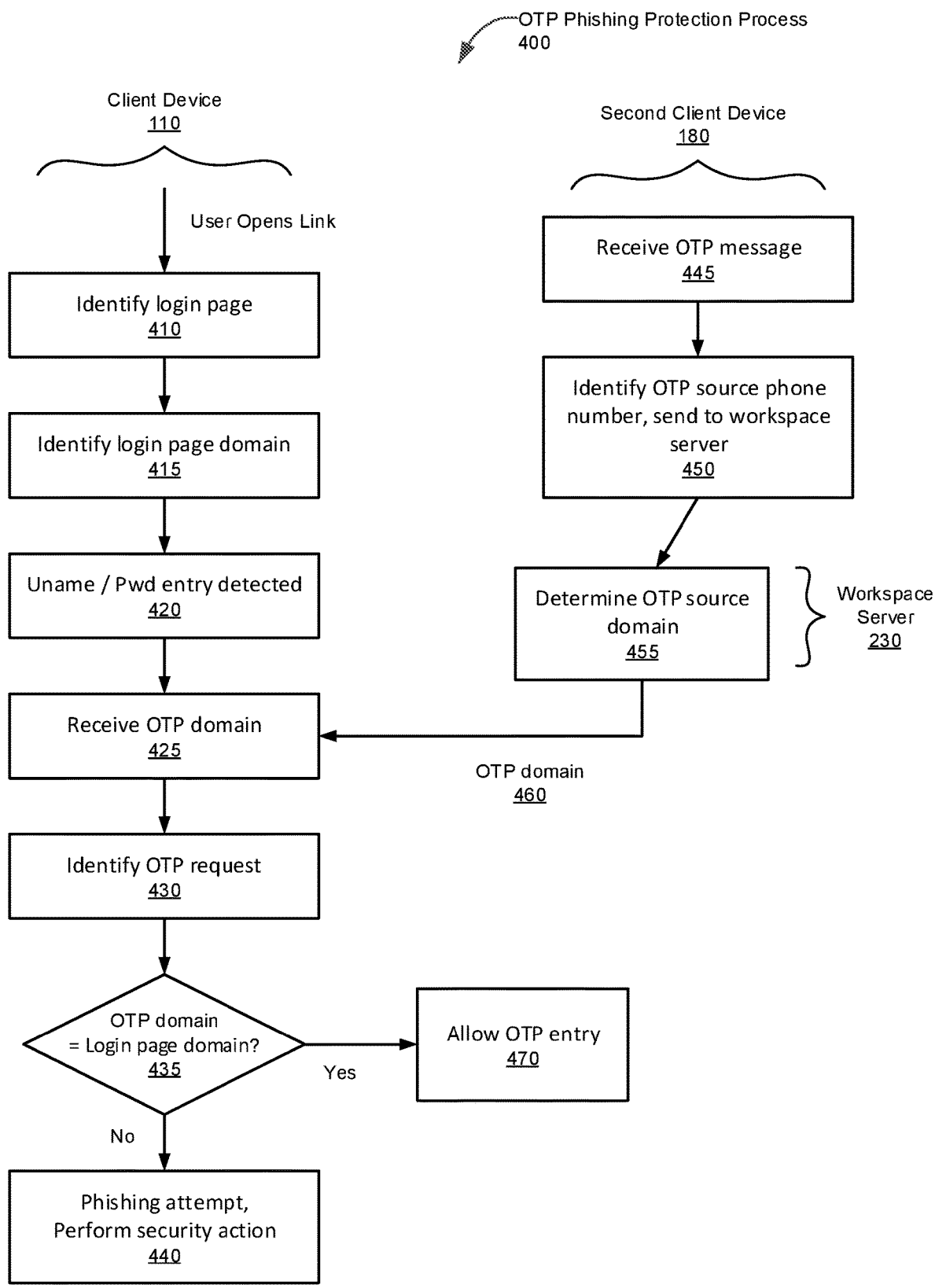
FIG. 4 is a flow diagram of a process for OTP phishing protection, in accordance with an example of the present disclosure.

FIG. 4 is a flow diagram of a process for OTP phishing protection, executed by the OTP phishing protection system 250, the login/OTP monitor 270, the OTP monitor 280, and the workspace server 230, all of FIG. 2, or the sub-components thereof in accordance with an example of the present disclosure.

After a user of the client device opens a provided link, using the browser 260, of FIG. 2, the login/OTP monitor 270 identifies, at operation 410, that a login page or login form has been served to the browser, as described below. At operation 415, the domain name of the login page is identified, as described below. So, for example, if the link was provided by a phishing site, the domain name of the phishing site is identified. Similarly, if the link is associated with a legitimate site then the domain name of the legitimate site is identified.

In some examples, identification of the login form may be accomplished through analysis of Hypertext Markup Language (HTML) input field labels on those forms. For example, the analysis may be performed to detect fields which are labeled as "username," "password," or other such similar login related nomenclature. In some examples, identification of the domain associated with the login form may be accomplished by extracting the domain name from the Uniform Resource Locator (URL) of the login form. In some examples, the identification of the login form may be performed using computer vision analysis of the forms (e.g., optical character recognition), to recognize text such as "username," "password," or the like. In some examples, computer vision analysis may incorporate machine learning techniques such as a neural network that has been trained to recognize images of login pages.

At operation 420, entry of user credentials (e.g., username and password) into the login form is detected. At this point the phishing site may be triggered to use the provided credentials to attempt to login to the legitimate site which will cause an OTP message to be generated by the legitimate site.

Turning now to the second client device 180, of FIG. 1, the OTP message is received, at operation 445, by the OTP monitor 280. At operation 450, the phone number of the source of the OTP message is identified, and at operation 450, that phone number is transmitted to the workspace server 230.

With reference now to the workspace server 230, at operation 455, the phone number is used as an index to a database that is configured to cross reference OTP source phone numbers to OTP generating website domain names. An OTP source domain name 460 is thus determined and transmitted back to the client device 110.

At operation 425, the OTP phishing protection system receives the OTP source domain name 460.

At operation 430, a request by the identified web site, for user entry of an OTP, is detected by the login/OTP monitor 270. In some examples, detection of the entry request may be accomplished through analysis of HTML labels or through computer vision analysis to recognize text such as "Enter One-Time Password" or other such similar OTP related nomenclature. In some examples, computer vision analysis may incorporate machine learning techniques such as a neural network that has been trained to recognize images of OTP entry requests.

At operation 435, the OTP phishing protection system compares the OTP source domain name to the login page domain name.

If the OTP source domain name does not match (e.g., the strings are not the equal) the login page domain name, then at operation 440, a phishing attempt is detected, and a security action may be performed. Otherwise, at operation 470, entry of the OTP is allowed.

Figure 5:
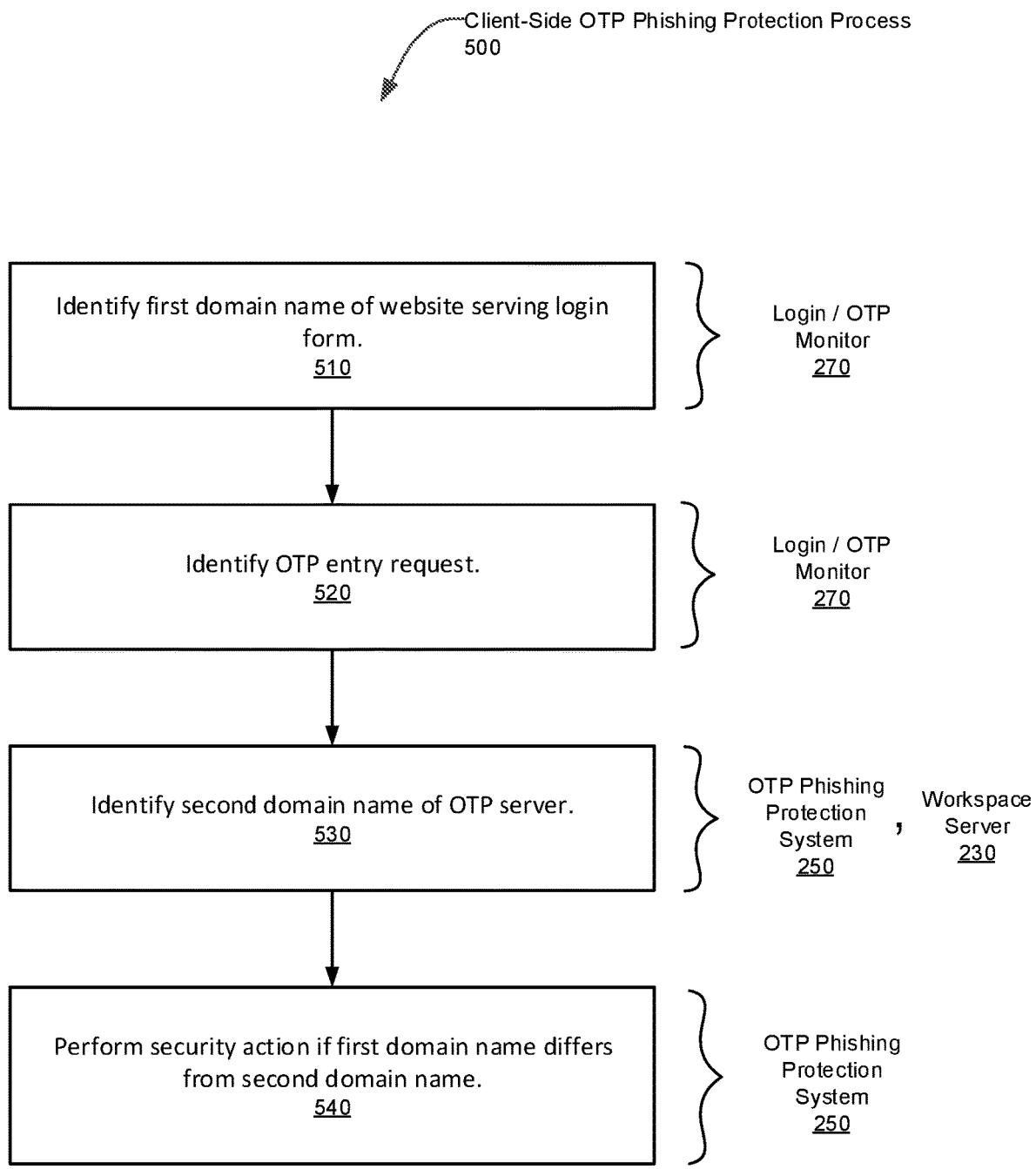
FIG. 5 is a flow diagram of a client-side process for OTP phishing protection, in accordance with an example of the present disclosure.

FIG. 5 is a flow diagram of a client-side process for OTP phishing protection, executed by the OTP phishing protection system 250 and the login/OTP monitor 270, of FIG. 2, or the sub-components thereof in accordance with an example of the present disclosure.

At operation 510, a first domain name is identified as the domain name associated with the website serving a login form to the web browser of the client device.

Next, at operation 520, an OTP entry request is identified as being served to the web browser of the client device by the website in response to transmission of user credentials (e.g., username and password) to the website.

At operation 530, a second domain name is identified as the domain name associated with an OTP server that generated and provided an OTP in response to the entry of the user credentials, for example through an SMS text message sent to a mobile device or through an email message sent to an email application executing on the mobile device or the client device.

At operation 540, a security action is performed in response to determining that the first domain name differs from the second domain name. In some examples, the security action comprises blocking a response to the OTP request from the website and/or providing a warning to the user and obtaining confirmation for the response to the OTP entry request from the website. In some examples, the security action may also include suggesting that the user change their password since it has been compromised at this point. A link to the password reset page of the legitimate site may also be provided to the user as a convenience. In some examples, the password reset page link may be stored in and obtained from the OTP database 320, of FIG. 3.

Figure 6:
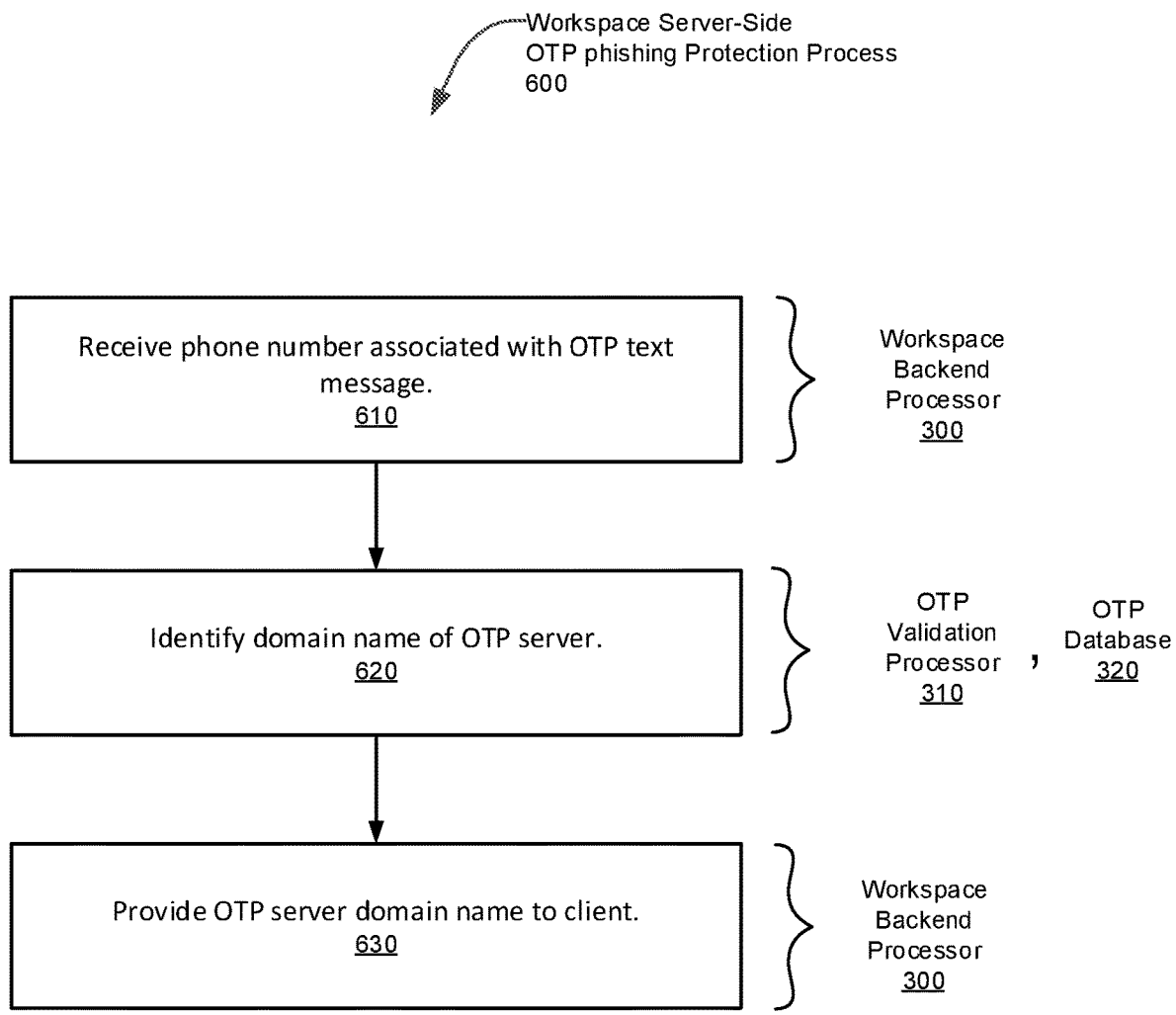
FIG. 6 is a flow diagram of a workspace server-side process for OTP phishing protection, in accordance with an example of the present disclosure.

FIG. 6 is a flow diagram of a workspace server-side process for OTP phishing protection, executed by the workspace backend processor 300 and the OTP validation processor 310, of FIG. 3, or the sub-components thereof in accordance with an example of the present disclosure.

At operation 610, a phone number is received from a mobile device or smartphone associated with the client device. In some examples, the phone number is associated with an SMS text message sent to the mobile device, the text message including the OTP generated by the OTP server.

Next, at operation 620, a domain name associated with the OTP server is identified based on the phone number. In some examples, the identification is accomplished by reference to a database that is configured to cross-reference phone numbers to OTP server domain names. In some examples, the database is created and updated using crowdsourcing techniques. For example, a monitoring process may detect successful logins (that involved OTP authentication) by many users over time. In each such case, the phone number of the source of the OTP is noted along with the domain name of the site into which the successful login occurred. This information is accumulated over time to build the database. In some examples, the database is accessed from public sources (e.g., made available by third parties) that maintain lists of OTP generated phone numbers that are cross-references to OTP server domain names.

At operation 630, the identified domain name is provided to the OTP phishing protection system hosted on the client device.

As previously described, in some examples, the OTP may be sent as an email message or through any other suitable mechanism. If the OTP is sent to an email application or email client, the email application can identify the source address and the OTP validation processor 310 can resolve this to the domain name of the OTP generator. For example, an email client may be configured to read emails and analyze the text using natural language processing/natural language understanding techniques (e.g., based on machine learning) to determine that the email contains an OTP. Instead of a phone number, however, the source or sender email address is recognized, and the database 320, of FIG. 3, may be used to find the domain name. As another example, a browser extension on the client device can identify an opened email application and use Document Object Model techniques to analyze the content of the email and identify the OTP and sender information.

Also, in some examples, the OTP may be sent directly to the first client device 110, of FIG. 1, in which case the second client device 180, of FIG. 1 is unnecessary, and the first client device can interact with the workspace server 230, of FIG. 2. In some examples, the OTP validation process and the OTP database may also be implemented on the first client device 110, and the OTP database on the client device may be periodically synced with the OTP database on the workspace server, for example during device connection with the server.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for OTP Phishing Protection

Figure 7:
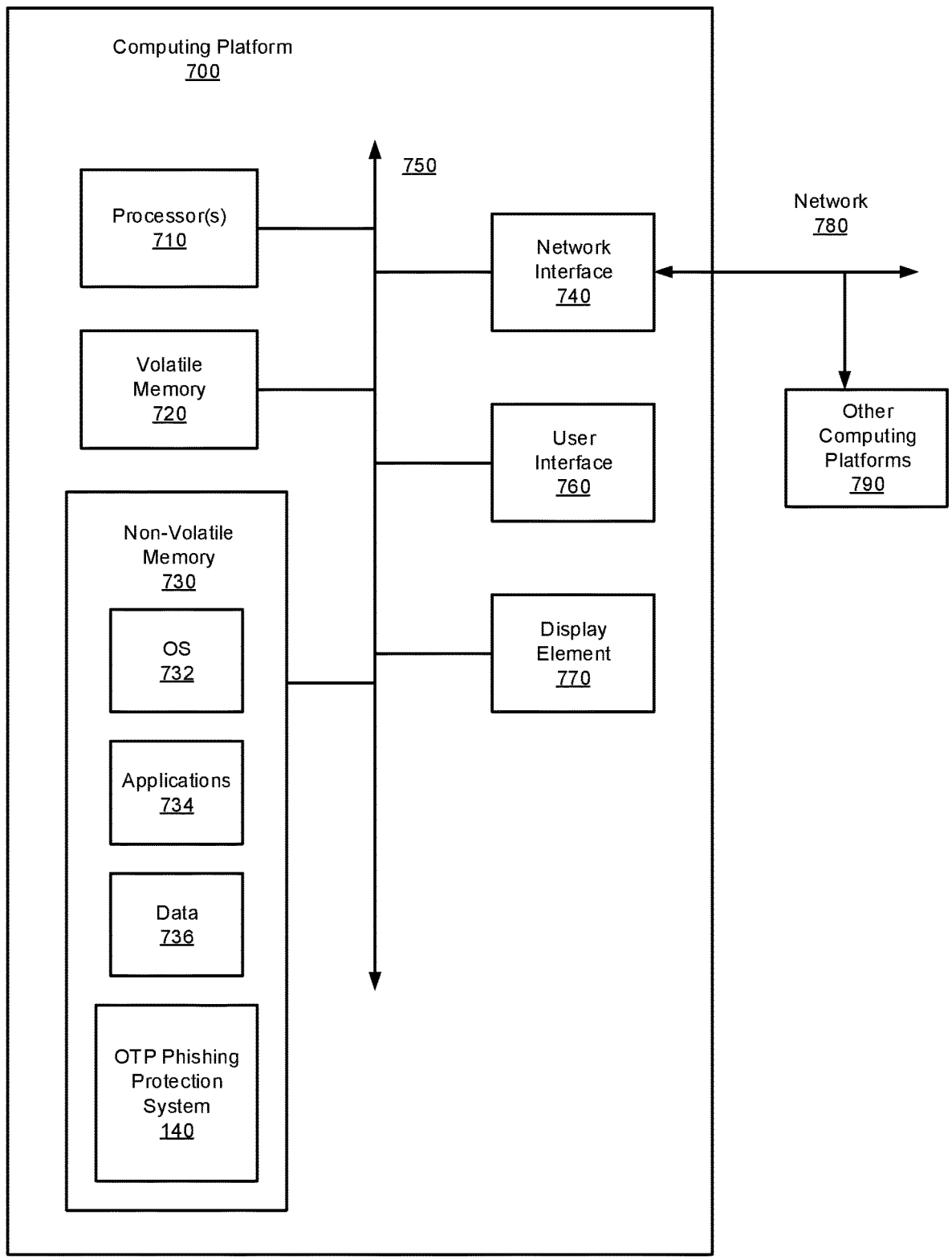
FIG. 7 is a block diagram of a computing platform configured to perform a process for OTP phishing protection, in accordance with an example of the present disclosure.

FIG. 7 is a block diagram of a computing platform 700 configured to perform a process for OTP phishing protection, in accordance with an example of the present disclosure. In some cases, the platform 700 is the client device 110, of FIG. 1, which may be a workstation, server, laptop, mobile device, or smartphone, etc.

The computing platform or device 700 includes one or more processors 710, volatile memory 720 (e.g., random access memory (RAM)), non-volatile memory 730, one or more network or communication interfaces 740, user interface (UI) 760, display element (e.g., screen) 770, and a communications bus 750. The computing platform 700 may also be referred to as a computer or a computer system.

The non-volatile (non-transitory) memory 730 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 760 can include one or more input/output (I/O) devices (e.g., a mouse, a keyboard, a microphone, one or more speakers, one or more biometric scanners, one or more environmental sensors, and one or more accelerometers, etc.).

The display element 770, can provide a graphical user interface (GUI) and in some cases, may be a touchscreen or any other suitable display device.

The non-volatile memory 730 stores an operating system 732, one or more applications 734, and data 736. The applications may include a web browser 260 and OTP phishing protection system 250, all of FIG. 2, such that, for example, computer instructions of the operating system 732 and applications 734 are executed by processor(s) 710 out of the volatile memory 720. In some examples, the volatile memory 720 can include one or more types of RAM and/or a cache memory that can offer a faster response time than a main memory. Data can be entered through the user interface 760. Various elements of the computer 700 can communicate via the communications bus 750.

The illustrated computing platform 700 is shown merely as an example client device or server and can be implemented by any computing or processing environment with any type of machine or set of machines that can have suitable hardware and/or software capable of operating as described herein.

The processor(s) 710 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 710 can be analog, digital, or mixed. In some examples, the processor 710 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 740 can include one or more interfaces to enable the computing platform 700 to access a computer network 780 such as a Local Area Network (LAN), a Wide Area Network (WAN), a Personal Area Network (PAN), or the Internet through a variety of wired and/or wireless connections, including cellular connections. In some examples, the network 780 may allow for communication with other computing platforms 790, to enable distributed computing.

In described examples, the computing platform 700 can execute an application on behalf of a user of the client device. For example, the computing platform 700 can execute one or more virtual machines managed by a hypervisor. Each virtual machine can provide an execution session within which applications execute on behalf of a user or a client device, such as a hosted desktop session. The computing platform 700 can also execute a terminal services session to provide a hosted desktop environment. The computing platform 700 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory; and
at least one processor coupled to the memory and configured to:
identify a first domain name associated with a website that served a login form for entering user credentials to a web browser;
identify a one-time password (OTP) entry request served from the website in response to transmitting the user credentials to the website;

identify a second domain name associated with an OTP server that provided an OTP corresponding to the OTP entry request;

determine that the first domain name differs from the second domain name; and perform a security action in response to the determination.

2. The computer system of claim 1, wherein the security action comprises blocking a response to the OTP entry request from the website.

3. The computer system of claim 1, wherein the security action comprises providing a warning and obtaining confirmation for the response to the OTP entry request from the website.

4. The computer system of claim 1, wherein the at least one processor is further configured to receive the OTP from the OTP server through a Short Message Service (SMS) text message.

5. The computer system of claim 1, wherein the computer system is a first client device and the at least one processor is further configured to receive the OTP from a second client device, wherein the OTP is sent to the second client device as an SMS text message from the OTP server.

6. The computer system of claim 1, wherein the at least one processor is further configured to receive the OTP through an email from the OTP server.

7. The computer system of claim 1, wherein the at least one processor is further configured to provide credentials entered into the login form to the to the website to trigger the OTP entry request.

8. The computer system of claim 1, wherein the at least one processor is further configured to analyze Hypertext Markup Language (HTML) input field labels to detect that the website served the login form and the OTP entry request to the web browser.

9. The computer system of claim 1, wherein the at least one processor is further configured to perform computer vision analysis to detect that the website served the login form and the OTP entry request to the web browser.

10. A non-transitory computer readable medium storing executable sequences of instructions to provide protection against phishing of one-time passwords (OTPs), the sequences of instructions comprising instructions to:

identify a first domain name associated with a website that served a login form to a web browser for entering user credentials;

identify an OTP entry request served from the website in response to transmitting the user credentials to the website;

identify a second domain name associated with an OTP server that provided an OTP corresponding to the OTP entry request;

determine that the first domain name differs from the second domain name; and perform a security action in response to the determination.

11. The computer readable medium of claim 10, wherein the security action comprises blocking a response to the OTP entry request from the website.

12. The computer readable medium of claim 10, wherein the security action comprises providing a warning and obtaining confirmation for the response to the OTP entry request from the website.

13. The computer readable medium of claim 10, wherein the sequences of instructions further include instructions to receive the OTP from the OTP server through a Short Message Service (SMS) text message.

14. The computer readable medium of claim 10, wherein the computer system is a first client device and the sequences of instructions further include instructions to receive the OTP from a second client device, wherein the OTP is sent to the second client device as an SMS text message from the OTP server.

15. The computer readable medium of claim 10, wherein the sequences of instructions further include instructions to receive the OTP through an email from the OTP server.

16. The computer system of claim 1, wherein the sequences of instructions further include instructions to provide credentials entered into the login form to the website to trigger the OTP entry request.

17. The computer readable medium of claim 10, wherein the sequences of instructions further include instructions to analyze Hypertext Markup Language (HTML) input field labels to detect that the website served the login form and the OTP entry request to the web browser.

18. The computer readable medium of claim 10, wherein the sequences of instructions further include instructions to perform computer vision analysis to detect that the website served the login form and the OTP entry request to the web browser.

* * * * *